No. 646,937. Patented Apr. 10, 1900.
J. W. ANDERSON.
DAMPER.
(Application filed Aug. 3, 1896.)

(No Model.) 2 Sheets—Sheet 1.

Witnesses.
Edw. D. Duvall Jr.
C. F. Duvall

Inventor.
John W. Anderson.
By H. J. Duvall
Atty.

No. 646,937. Patented Apr. 10, 1900.
J. W. ANDERSON.
DAMPER.
(Application filed Aug. 3, 1896.)
(No Model.) 2 Sheets—Sheet 2.
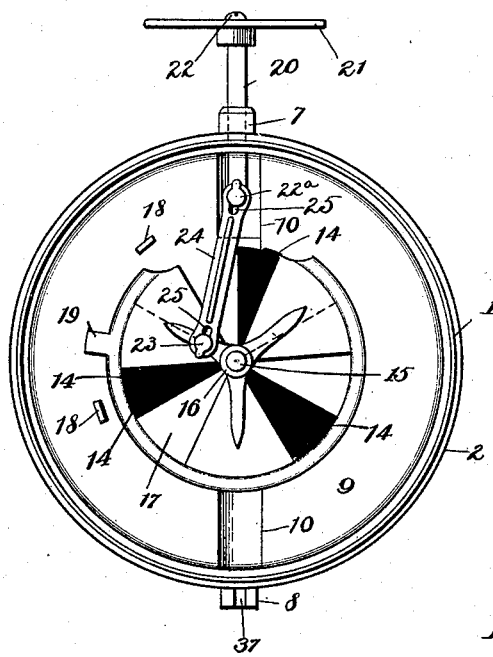
Fig. 6.
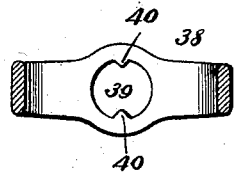
Fig. 7.
Fig. 3.
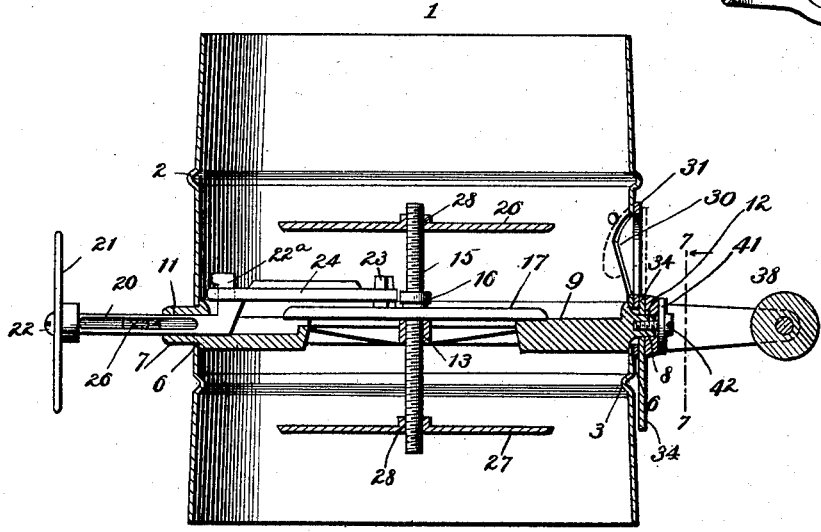
Witnesses.
Inventor.
John W. Anderson.

UNITED STATES PATENT OFFICE.

JOHN W. ANDERSON, OF LANCASTER, PENNSYLVANIA.

DAMPER.

SPECIFICATION forming part of Letters Patent No. 646,937, dated April 10, 1900.

Application filed August 3, 1896. Serial No. 601,491. (No model.)

*To all whom it may concern:*

Be it known that I, JOHN W. ANDERSON, a citizen of the United States, residing at Lancaster, in the county of Lancaster and State of Pennsylvania, have invented certain new and useful Improvements in Dampers; and I do hereby declare the following to be a full, clear, and exact description of the invention, such as will enable others skilled in the art to which it appertains to make and use the same.

My invention relates to improvements in dampers, and has particular reference to certain new and useful improvements in that construction of damper illustrated, described, and claimed in United States Patent No. 517,993, granted me April 10, 1894.

The objects of my present invention are to simplify and cheapen the construction of the damper shown in the patent referred to, to provide for a more positive as well as a graduated adjustment of the damper plate or valve, to obviate the escape of gases when the damper is closed, and to improve other details of construction that will hereinafter appear and which will be particularly pointed out in the claims.

Figure 1:
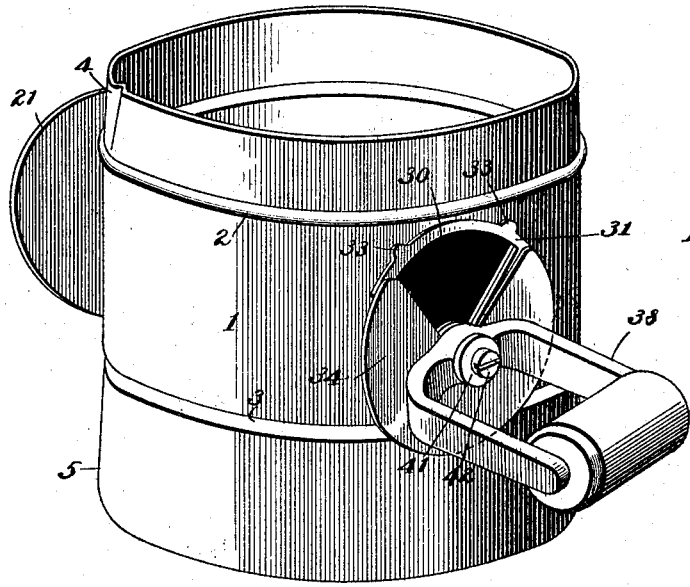
Figure 2:
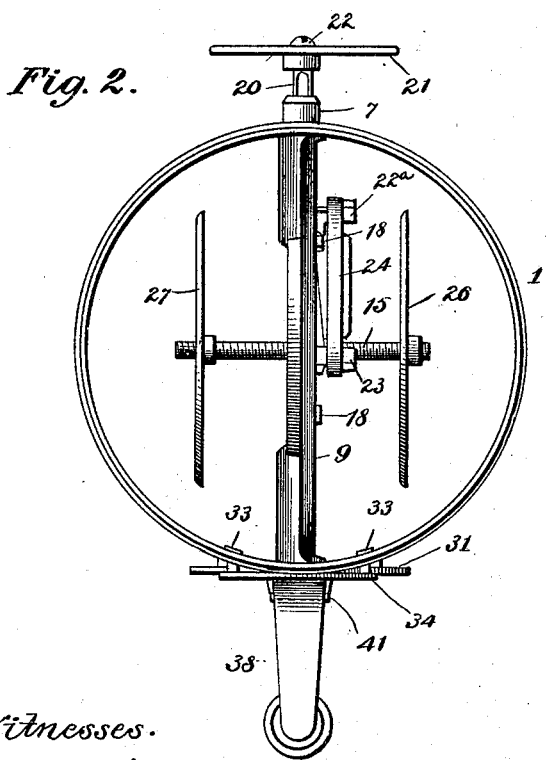
Figure 4:
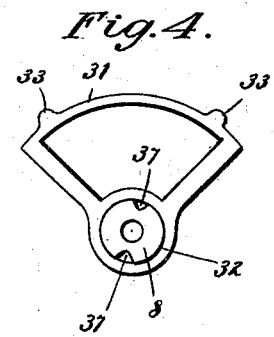
Figure 5:
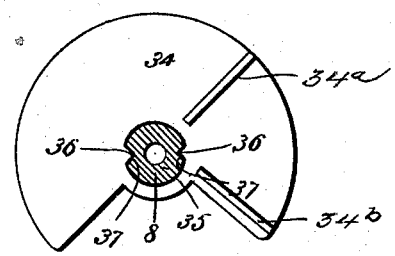

Referring to the drawings, Figure 1 is a perspective view of a stovepipe-section in which my invention is embodied, the parts being shown in the position they occupy when the damper is closed to wholly or partially obstruct the draft. Fig. 2 is a top plan view, the damper being turned so as to permit of a free draft. Fig. 3 is a vertical longitudinal sectional view through the pipe-section. Fig. 4 is a detail of the cut-off frame-plate; Fig. 5, a similar view of the cut-off plate. Figs. 6 and 7 are details of the handle for rotating the damper.

Like numerals of reference indicate like parts in all the figures of the drawings.

In practicing my invention I prefer to assemble the parts composing the same in a short section 1 of stovepipe, the same being designed to be joined by connecting the two adjacent ends of a pair of adjacent stovepipe-sections. If preferred, however, it will be obvious that my invention may be constructed in or applied to any ordinary flue. In the present instance, however, I have illustrated my invention as mentioned in a short section 1 of stovepipe and prefer to form upon the same adjacent to its upper end an external annular bead 2 and near its lower end an internal annular bead 3. Above the annular bead 2 the end of the section 1 is slightly crimped, as indicated at 4, while below the internal annular bead 3 the end of the section 1 is slightly flared, as at 5. The crimping at the upper end of the section 1 facilitates the introduction of the upper end of the section into the adjacent end of a superimposed pipe-section, while the lower flared end of the section 1 facilitates the introduction of said end over the adjacent end of a lower pipe-section, the two beads 2 and 3 serving in a manner that will be obvious to limit the telescopic action of the aforesaid sections, and therefore preventing them from interfering in any manner with the free action of the parts hereinafter described.

The stovepipe-section 1 is provided at diametrically-opposite sides with circular openings 6, in which are arranged for rotation the opposite trunnions 7 and 8, that are formed at diametrically-opposite points on the side edge of an annular damper 9. In line with these trunnions 7 and 8 depressions 10 are formed in the upper surface of the damper 9. The trunnion 7, in line with the depression 10, is provided with an angular bore 11, while the trunnion 8 is provided with a corresponding cylindrical threaded bore 12. The damper 9 is provided with a central perforation 13, and beyond the same in a different radius has formed at intervals segmental-shaped openings 14. The under side of the plate is strengthened by annular and radial ribs, as shown, whereby a lighter plate may be employed. Within the central opening 13 of the damper there is located an axially-disposed threaded stem 15, which extends above and below said damper, as shown. Above the damper the stem is provided with a nut 16, which serves to retain in rotative position upon said damper a damper or valve-plate 17, which has openings corresponding to those in the damper and which by rotation may be caused to wholly or partially close the said openings in the damper or wholly open the same for the purpose of regulating the draft or entirely arresting said draft. The movements of the valve-plate, it will be observed, are limited by means of two stop-lugs 18, that are formed upon the upper side of the plate 9, and a radial lug 19, that is formed upon the outer edge of the valve-plate 17.

Located for reciprocation in the rectangular bore 11 of the trunnion 7 is a correspondingly-shaped adjusting-rod 20, the outer end of which lies beyond the bore and the inner end of which moves within the adjacent groove or depression 10. At the outer end of the adjusting-rod 20 a disk-shaped handle 21 is preferably secured by means of a screw 22, and at the inner end of the rod there is formed upon the upper side a key-shaped lug $22^a$. A similar lug 23 is formed upon the upper side of the valve-plate 17, and these two lugs are loosely connected by an intermediate connecting-bar 24, whose ends are provided with keyhole-shaped openings 25, so that while the rod is secure upon the lugs yet a disconnection of the two is possible by a proper manipulation of the parts, as will be obvious. Upon one side of the rod 20 I prefer to form a scale 26, consisting of the numerals "1," "2," "3," "4," and by adjusting the rod so as to expose the said numerals it will be seen that the same will indicate the relative position of the valve-plate upon the damper. For instance, when the rod 20 is pushed in, so as not to expose the scale, the valve-plate will be in such position upon the damper as to wholly close the openings therein, and thus all draft is cut off or arrested. By withdrawing the rod so as to expose the numeral "1" such will indicate that the valve-plate uncovers or exposes one-fourth of each opening in the damper, and by withdrawing the rod so as to expose the numeral "2" one-half of each opening will be exposed, and so on, each numeral that is exposed indicating an additional one-fourth. This means that I have described, it will be obvious, is both quick and positive and is to be greatly preferred over that construction employed for accomplishing the same purpose and illustrated in my former patent.

Threaded above and below the damper upon the stem 15, and therefore adjustable to and from the damper, are upper and lower deflecting-plates 26 and 27, respectively, the same being annular in shape and of less diameter than the damper. The deflecting-plates 26 and 27 are provided with centrally-located threaded perforations 28 for receiving the stem 15, so that by rotation the plates may be adjusted to or from the damper, and thus the path of the products of combustion be rendered more or less tortuous, as preferred.

Immediately above the opening 6 in the pipe-section, and which forms a bearing for the trunnion 8, there is formed in the said pipe-section an inlet-opening 30 for cold air, and surrounding the opening is a metal frame 31, the opening and frame in the present instance being of a substantially-segmental shape. The lower end of the frame is provided with a circular opening 32, that loosely receives the trunnion 8, while the upper edge of the frame is provided with inwardly-disposed rivets 33, that are secured to the pipe-section 1 by being upset within the same. Arranged to close the opening 32 either partially or wholly is a segmental cut-off 34, the same being adapted to slide over the frame 31 and having formed near its lower end a circular opening 35, that receives the projecting trunnion 8 and is caused to move therewith through the provision of diametrically-opposite lugs 36, that are formed at the edge of the opening 35 and which engage with corresponding grooves 37, formed in the projecting trunnion 8. As shown in Fig. 5, the rear face of the segmental cut-off 34 is provided with radial superficial stop-ribs $34^a$ and $34^b$, the same being designed to contact with the opposite edges of the frame 31 when said cut-off plate is rotated either for the purpose of opening or closing the opening 30.

A spade-handle 38 is provided with a central opening 39 in its frame, and at diametrically-opposite sides of the opening lugs 40 are formed, which lugs correspond to the lugs 36 of the cut-off plate 34 and, like them, engage with the grooves 37 of the trunnion 8, whereby a rotation of the handle will cause a corresponding rotation upon the part of the damper and the parts carried thereby. A washer 41 is located at the end of the trunnion 8, and through the same and having its head bearing thereon is passed a frictional binding-screw 42, the same being threaded in the perforation formed in the end of the trunnion for its reception. By properly adjusting this frictional binding-screw the handle and damper, as well as the cut-off plate 34, may be caused to assume and retain any of its adjusted positions against any jarring that the damper might receive.

The operation of the invention being similar to the patented construction referred to will be obvious, but may be briefly stated as follows: To obtain a full draft, the handle 38 is grasped and given a quarter-turn, which presents the damper and its deflecting-plates edgewise to the direction of the draft and at the same time causes the cut-off plate to cover the opening 30, preventing the entrance of cold air. A reverse movement of the spade-handle 38 throws the damper to a horizontal position, and thus the draft may be entirely arrested or only partially so, all draft then being regulated by adjustment of the valve-plate in the manner heretofore described. By giving the handle a half-turn the damper is entirely reversed and the opening in the plate 34 is caused to correspond with the opening 30 in the pipe-section, so as to admit cold air at a point above the damper, which has the effect of preventing any escape of gases into the interior of the room or building. It will be obvious that the admission of cold air for this purpose may be effected at any point of the pipe-section by the formation of suitable openings and proper means for controlling the same.

Many drafts of stoves will require the plate 34 to be closed during the day in order to throw out the heat in cold weather; but the cold-air draft can be used both day and night, if needed. Ordinarily during the night the cold-air draft should be open; but in some poorly-drawing stoves the cold-air draft will be required to be closed throughout the day. I would therefore have it understood that I do not limit my invention to the precise details of construction herein shown and described for securing the various objects specified, but hold that I may vary the same to any degree and extent within the knowledge of the skilled mechanic.

Having described my invention, what I claim is—

1. The combination with a pipe-section having opposite openings, of a damper provided with draft-openings and having trunnions mounted in said pipe-openings; one of said trunnions having a longitudinal bore opening at its inner end into a radial recess in the upper side of the damper, an apertured valve-plate pivoted on the damper and provided with an upwardly-projecting key-shaped lug, a rod sliding through the bore of the trunnion and in the recess of the damper and having a key-shaped lug on the inner end projecting up through the damper radial recess and a link having keyhole-slots in its ends receiving said two key-shaped lugs, whereby the use of rivets and screws will be obviated.

2. The combination with a pipe-section having opposite openings, of a damper provided with draft-openings and having trunnions mounted in said pipe-openings; one of said trunnions having an angular bore opening at its inner ends into a similar radiating recess in the upper side of the damper, an apertured valve-plate pivoted on the damper, a non-rotatable operating-rod sliding through and shaped to correspond with the trunnion-bore, a link separably connected at the ends to the upper side of the valve-plate and the upper side of the inner end of the operating-rod (for readily assembling the parts) and a handle on the outer end of the rod; one side of the said rod being adapted to receive graduation-marks.

3. The combination with a pipe-section having opposite openings, of a damper provided with trunnions arranged in and projecting beyond the openings, one of said trunnions being provided with a groove, an opening above said grooved trunnion and the damper, a frame-plate arranged over the opening, secured to the pipe-section and having a hole for the trunnion, a cut-off plate arranged to slide in close proximity to the frame and having an opening for the trunnion, which opening is provided with lugs for engaging the grooves of the trunnion, a washer at the end of the trunnion, a handle having an opening to receive the trunnion and provided with lugs for engaging the grooves thereof and interposed between the washer and the cut-off plate, and a binding-screw passed through the washer and into the end of the said trunnion, substantially as specified.

4. The combination with a stovepipe provided with trunnion-openings and a cold-air opening adjacent to one of said trunnion-openings, of an apertured damper provided with an apertured valve-plate and having trunnions extending through said trunnion-openings, handles connected with both trunnions to provide for operating the damper from either side of the pipe, a cold-air cut-off, carried by one of the trunnions and a sliding rod extending through the other trunnion and connected with and adapted to operate the valve-plate; said sliding rod carrying the handle at that side of the stovepipe.

In testimony whereof I affix my signature in presence of two witnesses.

JOHN W. ANDERSON.

Witnesses:
JOHN W. APPEL,
J. W. F. SWIFT.